(12) United States Patent
Kukreja et al.

(10) Patent No.: US 10,929,217 B2
(45) Date of Patent: Feb. 23, 2021

(54) MULTI-VARIANT ANOMALY DETECTION FROM APPLICATION TELEMETRY

(71) Applicant: Microsoft Technology Licensing, LLC, Redmond, WA (US)

(72) Inventors: Muskan Kukreja, Redmond, WA (US); Fnu Vijay Krishnan, Sammamish, WA (US); Uma Shankar V. Stanam, Sammamish, WA (US); Michael C. Cales, Redmond, WA (US); Sandipan Ganguly, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 288 days.

(21) Appl. No.: 15/933,137

(22) Filed: Mar. 22, 2018

(65) Prior Publication Data
US 2019/0294485 A1  Sep. 26, 2019

(51) Int. Cl.
*G06F 11/07* (2006.01)
*G06F 11/30* (2006.01)
(Continued)

(52) U.S. Cl.
CPC ........ *G06F 11/079* (2013.01); *G06F 11/0751* (2013.01); *G06F 11/0772* (2013.01);
(Continued)

(58) Field of Classification Search
CPC ............... G06F 11/079; G06F 11/0751; G06F 11/0772; G06F 11/0775; G06F 11/3006; G06F 11/3404
See application file for complete search history.

(56) References Cited

U.S. PATENT DOCUMENTS 8,887,286 B2  11/2014  Dupont et al.
8,977,905 B2   3/2015  Zhu et al.
(Continued)

FOREIGN PATENT DOCUMENTS

WO  2013072232 A1  5/2013

OTHER PUBLICATIONS

"International Search Report and Written Opinion Issued in PCT Application No. PCT/US19/20682", dated May 23, 2019, 21 Pages.

*Primary Examiner* — Matthew M Kim
*Assistant Examiner* — Indranil Chowdhury
(74) *Attorney, Agent, or Firm* — Michael Best & Friedrich LLP (57) ABSTRACT

In one example, a system includes an electronic processor configured to receive telemetry data originating from a plurality of client applications. The telemetry data includes data points associated with errors associated with one or more operations. The electronic processor also classifies the telemetry data based a plurality of classes of data, converts the plurality of classes of data into one or more metrics based on a plurality of dimensions, and aggregates the metrics for the classes of data by all the dimensions. The electronic processor accesses a predictive scoring model for a stored metric associated with a dimension of interest, determines a prediction error associated with the dimension of interest, detects an anomaly based on an item selected from the group consisting of the prediction error and a static threshold, and transmits an alert message, generates a bug report, and stores the bug report in a database.

20 Claims, 7 Drawing Sheets

(51) Int. Cl.
*G06F 11/34* (2006.01)
*G06N 20/00* (2019.01)

(52) U.S. Cl.
CPC ...... *G06F 11/0775* (2013.01); *G06F 11/3006* (2013.01); *G06F 11/3404* (2013.01); *G06N 20/00* (2019.01)

(56) References Cited

U.S. PATENT DOCUMENTS

| | | |
|---|---|---|
| 9,189,623 B1 | 11/2015 | Lin et al. |
| 9,223,972 B1 | 12/2015 | Vincent et al. |
| 9,626,277 B2 | 4/2017 | Thangamani et al. |
| 9,990,273 B2* | 6/2018 | Ilangovan ........... G06F 11/3006 |
| 10,102,056 B1* | 10/2018 | Goldberg .............. G06F 11/079 |
| 10,459,827 B1* | 10/2019 | Aghdaie ............ G06F 11/0766 |
| 10,579,932 B1* | 3/2020 | Cantrell .................. G06F 17/16 |
| 2009/0249129 A1 | 10/2009 | Femia |
| 2012/0054184 A1* | 3/2012 | Masud .................. G06F 16/285 707/737 |
| 2013/0198119 A1* | 8/2013 | Eberhardt, III ........ G06N 20/00 706/12 |
| 2014/0096249 A1* | 4/2014 | Dupont ................... G06F 21/00 726/23 |
| 2015/0365309 A1 | 12/2015 | Kaminski et al. |
| 2017/0124478 A1 | 5/2017 | Baradaran et al. |
| 2017/0250855 A1 | 8/2017 | Patil et al. |
| 2019/0188065 A1* | 6/2019 | Anghel .................. G06N 7/005 |
| 2019/0306011 A1* | 10/2019 | Fenoglio ................. H04L 41/22 |
| 2020/0073741 A1* | 3/2020 | Wang .................. G06F 11/0751 |

* cited by examiner

MULTI-VARIANT ANOMALY DETECTION FROM APPLICATION TELEMETRY

FIELD

Embodiments described herein relate to anomaly detection from application telemetry.

BACKGROUND

An anomaly (also known as: outlier, noise, deviation, or exception) is, in general, an item or event that differs from expectations. In computer science, anomaly detection refers to identifying data, events, or conditions which do not confirm to an expected pattern or to other items in a group. Encountering an anomaly may in some cases indicate a processing abnormality and thus may present a starting point for investigation. Traditionally, anomalies are detected by a human being or a computing system studying a trace. A trace includes a log of information that can come from an application, process, operating system, hardware component, and/or a network.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

With the advent of new technologies in data collection and the adoption of agile methodologies, servers produce a high volume and velocity of a variety of data that may be used to assesses the quality of code, product, and usage. The size of the data collected for anomaly detection is typically in the range of petabytes (pB). Through the observation of billions of data points, millions of anomalies are generated, which are typically not actionable due to the sheer volume of anomalies. As a result, new methods and systems of anomaly detection are necessary to handle the high volume and high velocity of data received from software application telemetry and reduce the computation expense in processing such anomalies.

Embodiments described herein provide systems and methods for, among other things, the collection of telemetry data associated with several software applications at relatively high-frequency intervals with a relatively high level of detail. Embodiments also provide methods and systems for simultaneously detecting anomalies associated with the software applications. One example includes monitoring crashes across various software products, for example, monitoring crashes every minute across different platforms (for example, Windows, Mac, Linux, etc.), software applications (for example, Microsoft Office, Word, PowerPoint, Excel, etc.), country, language, processors, build version, audience, screen size, etc. and providing anomaly detection to remediate the detected anomalies.

Some embodiments detect errors at relatively deep level of a hierarchy of errors associated with monitored software applications executed on client devices. In some instances, the hierarchy of errors has an inverted tree-branch structure where in the path from the top to an end of any branch is termed a "pivot" (also referred to as a "dimension" herein). At the deepest level of each pivot (for example, the "leaf nodes"), the corresponding nodes are labeled as "1" when there is an anomaly or error. When there is no error at a node, it is labeled as "0". Once the nodes are labeled, each pivot is investigated and the errors are rolled-up towards the root node while monitoring and determining the frequency of anomalies, severity of anomalies and usage scores of operations associated with the monitored software applications. Using this process, pivots that are more anomalous than others can be identified. Identifying these pivots provides actionable insights related to the errors being "non-critical" or "critical." As a result, only a smaller number of anomalies need to be addressed thereby reducing the computational resources compared to traditional anomaly detection techniques.

An example embodiment includes a computer system for anomaly detection using application telemetry. The computer system includes an electronic processor configured to receive telemetry data originating from a plurality of client applications. The telemetry data including data points representing errors associated with one or more operations of the plurality of client applications. The electronic processor is further configured to classify the telemetry data based on a plurality of classes of data, convert the plurality of classes of data into one or more metrics across a plurality of dimensions, aggregate the metrics for the classes of data across the plurality of dimensions, access a predictive scoring model to generate or determine a prediction error associated with a dimension of interest, detect an anomaly based on an item selected from the group consisting of the prediction error and a static threshold, and output an alert message associated with the anomaly. The computer system also includes a display device to display the alert message.

Another example embodiment includes a method for anomaly detection using application telemetry. The method includes receiving telemetry data originating from a plurality of client applications, the telemetry data including data points representing errors associated with one or more operations of the plurality of client applications. The method also includes classifying the telemetry data based on a plurality of classes of data; converting the plurality of classes of data into one or more metrics based on a plurality of dimensions; aggregating the metrics for the classes of data across the plurality of dimensions; accessing a predictive scoring model for a prediction error associated with a dimension of interest; detecting an anomaly based on an item selected from the group consisting of the prediction error and a static threshold; and outputting an alert message associated with the anomaly.

Another example embodiment includes a non-transitory computer-readable medium containing instructions that when executed by one or more electronic processors cause the one or more electronic processors to perform the following actions: receive telemetry data originating from a plurality of client applications, the telemetry data including data points associated with errors associated with one or more operations; classify the telemetry data based on a plurality of classes of data; convert the plurality of classes of data into one or more metrics based on a plurality of dimensions; aggregate the metrics for the classes of data by all the dimensions; access a predictive scoring model for a stored metric associated with a dimension of interest; determine a prediction error associated with the dimension of interest; detect an anomaly based on an item selected from the group consisting of the prediction error and a static threshold; and transmit an alert message, generate a bug report and store the bug report in a database.

By the use of the techniques disclosed herein, one or more devices can be configured to, among other things, conserve resources with respect to power resources, memory resources, communications bandwidth resources, processing resources, and/or other resources while providing mechanisms for automatically detecting anomalies relating to an online software application using telemetry data. Technical effects other than those mentioned herein can also be realized from an implementation of the technologies disclosed herein.

BRIEF DESCRIPTION OF THE DRAWINGS

The present disclosure will be better understood from the following detailed description read in light of the accompanying drawings, wherein like reference numerals are used to designate like parts in the accompanying description.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between entities or actions.

Embodiments of the present disclosure are directed to, among other things, methods and systems for automatically detecting an anomaly relating to a software application using telemetry data. Although, many of the examples presented herein are described in terms of cloud-based applications, the configurations disclosed herein can be implemented in a number of ways and in varying applications. More particularly, the techniques and systems described herein can be applied to a variety of software applications that experience anomalies and that are capable of being monitored, for example, as a consequence of being run on platforms, devices, or networks that may be accessed and monitored or that may provide telemetry data that may be accessed and analyzed.

Figure 1:
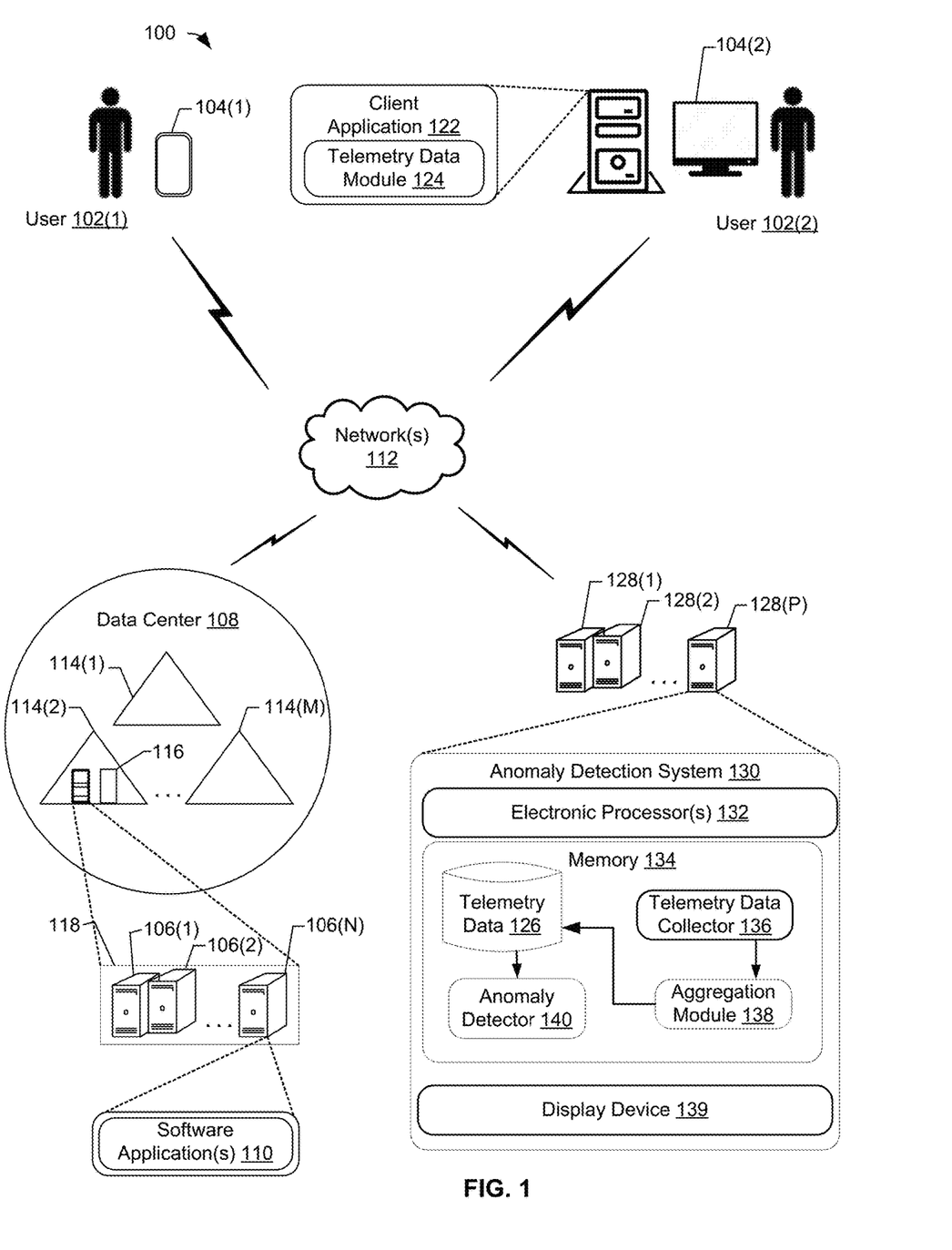
FIG. 1 illustrates an example environment for implementing an anomaly detection system for a software application that utilizes telemetry data.

FIG. 1 illustrates an example environment 100 for implementing an anomaly detection system for a software application that utilizes telemetry data. In the environment 100, a first user 102(1) and a second user 102(2) (collectively, "users 102") represent a plurality of users 102 that can access and use client computing devices 104(1) and 104(2) (collectively "client devices 104") to access one or more application servers 106(1), 106(2), . . . 106(N) (collectively "server(s) 106") of a datacenter 108. The severs 106 store and run one or more software application(s) 110. The software application(s) 110 can include, without limitation, a personal information management (PIM) application, for example an email application, a web-hosting application, a storage application, a storage service, a virtual machine application, a business productivity application, an entertainment service (for example, a music service, a video service, a gaming service, etc.), a personal productivity service (for example, a travel service), a social networking application, or cloud-based applications. The user 102 accesses software application(s) 110 through a network 112.

The term "users," "consumers," "customers," or "subscribers" can be used interchangeably herein to refer to the users 102, and one or more users 102 can subscribe to, or otherwise register for, access to one or more of the software application(s) 110 as a "user" of the software application(s) 110. In this regard, a user can include an individual user 102 or a group of multiple users 102, for example when an enterprise with hundreds of employees registers as a user of the software application(s) 110. Accordingly, the datacenter 108 can utilize a database or a similar data structure to manage registered users of the software application(s) 110, including management of access credentials for individual users 102.

The client computing devices 104 (sometimes referred to herein as "client devices 104") can be implemented as any number of computing devices, including, without limitation, a personal computer, a laptop computer, a desktop computer, a portable communication device (for example, a mobile phone or a tablet), a set-top box, a game console, a smart television, a wearable device (for example, a smart watch, electronic smart glasses, fitness trackers, etc.), or other electronic device that can transmit/receive data over a network 112. The network(s) 112 is representative of many different types of networks, and includes wired and/or wireless networks that enable communications between the various entities in the environment 100. In some configurations, the network(s) 112 can include the Internet, local area networks (LANs), wide area networks (WAN), a mobile telephone networks (MTNs), and other types of networks, possibly used in conjunction with one another, to facilitate communication between the server(s) 106 and the client devices 104. Although some configurations are described in the context of a web-based system, other types of client/server-based communications and associated application logic could be used.

The datacenter 108 can include a plurality of geographically-distributed server clusters, where a server cluster can include a subgrouping of the servers 106. In this manner, a vast number of users 102 can assess the software application(s) 110 from geographically disparate locations. The various resources of the datacenter 108 can be structured in any suitable organizational framework so that they can be tracked and managed. For example, servers 106 of the datacenter 108 can be organized into a plurality of forests 114(1), 114(2), . . . 114(M) (collectively, "forests 114"), wherein a forest 114 represents an active directory group for a group of users 102 utilizing a subgroup of the servers 106. Users 102 can be widely distributed in terms of geography. As an illustrative example, a set of first forests 114 can represent users and servers in North America (for example, a region), while a set of second forests 114 can represent other users and servers in South America (for example, another region), and so on. Regions can be defined at various levels of granularity, for example, continent, country, state, city, county, neighborhood, and so on. Within each forest 114 is a collection of sites 116, which represents lower level grouping of users and servers, and within each site 116 is a collection of database availability groups (DAGs) 118. Within each DAG 118 is a collection of servers 106. By managing the datacenter 108 in a hierarchical framework, the location of a problem or anomaly that occurs with the software application(s) 110 can be more easily identified.

FIG. 1 shows that the client devices 104 are configured to execute a client application 122 that is configured to access the software application(s) 110 over the network 112. For example, the client application 122 can include an email client application 122 that is built into, or downloaded after manufacture to, the client device 104 and configured to access an email-based software application 110 to allow the user 102(2) to send and receive emails. Alternatively, the client application 122 can be a web browser that allows the client device 104 to access the software application(s) 110 in response to the user 102(2) entering a uniform resource locator (URL) in an address bar of the web browser.

In addition to connecting the client device 104 to the software application 110, the client application 122 can include a telemetry data module 124 that is configured to transmit telemetry data 126 to one or more servers 128(1), 128(2), . . . 128(P) (collectively "server(s) 128") of an anomaly detection system 130. The anomaly detection system 130 can be owned and operated by the service provider of the application 110, or by a third party entity that the service provider contracts with to analyze the telemetry data 126 and detect anomalies from the telemetry data 126 on behalf of the service provider of the software application 110.

In general, telemetry data 126 includes data that is generated as a result of the client application 122 accessing (connecting to, or disconnecting from) the software application(s) 110 and as a result of the user 102 using the software application(s) 110 via the client application 122. The telemetry data module 124 can cause the telemetry data 126 to be stored locally in local memory of the client device 103 and/or transmitted to the server(s) 128 periodically and/or in response to events or rules. For example, the telemetry data module 124 can store, in local storage, and/or transmit the telemetry data 126 every few minutes (for example, every 5, 10, or 15 minutes) or at another suitable time interval, as the software application(s) 110 is being accessed by the client application 122 and used by the user 102. As another example, a rule maintained by the client application 122 can specify that telemetry data 126 is to be stored locally and/or transmitted in response to an event, for example an event including a successful connection to the software application(s) 110, or an event including the generation of a particular error code indicative of a connection failure, and so on. Accordingly, the anomaly detection system 130 can receive telemetry data 126 originating from a plurality of client devices 104 as the client devices 104 are used to access the software application(s) 110 from various geographic locations.

The telemetry data 126 that is transmitted periodically and/or in response to an event or rule can include various types of data and various amounts of data, depending on the implementation. For example, the telemetry data 126 transmitted from an individual client device 104 can include, without limitation a user identifier (for example, a globally unique identifier (GUID of the user), a machine identifier that identifies the client device 104 being used to connect to the software application(s) 110, a machine type (for example, a phone, a laptop, etc.) along with information relating to the build, the make, the model, etc., logs of successful connections, executions, failed requests, logs of errors and error codes, a server identifier, logs of user input commands received via a user interface of the client application 122, service connectivity data (for example, login events, auto discover events, etc.), user feedback data (for example, login events, auto discover events, etc.) user feedback data (for example, feedback about features of the software application(s) 110), a client configuration, logs of time periods of the client device 122 took to respond to a user request event (longer time periods indicative of the client application 122 hanging or crashing), logs of time periods for server responses to client requests, logs of time periods for the following statuses: connected, disconnected, transient failures, trying to connect, failure lockout, or waiting and so on. It is to be noted that the telemetry data 126 does not include personal or private information other than a user identifier, and that the collection of any data that is regarded as personal or private in nature is not collected without first obtaining the explicit consent of the user 102.

The server(s) 128 of the anomaly detection system 130, which can be arranged in a cluster or as a server farm, and across multiple fleets of servers 128, are shown as being equipped with one or more electronic processors 132 and one or more forms of computer-readable memory 134. The electronic processor(s) 132 can be configured to execute instructions, applications, or programs stored in the memory 134. In some embodiments, the electronic processor(s) 132 can include hardware processors that include, without limitation, an electronic central processing unit (CPU), a field programmable gate array (FPGA), a specific integrated circuit (ASIC), a system-on-chip (SoC) or a combination thereof.

The computer-readable memory 134 is an example of computer storage media. In general, computer-readable memory 134 can include computer-executable instructions that, when executed by the processor(s) 132, perform various functions and/or operations described herein.

The components included in the computer-readable memory 134 can include a telemetry data collector 136 configured to collect or otherwise receive telemetry data 126 from which anomalies relating to the software application(s) 110 are to be detected. The telemetry data collector 136 can be configured to receive the telemetry data 126 originating from a plurality of client devices 104 as the client devices 104 are used to access the software application(s) 110. The telemetry data 126 received by the telemetry data collector 136 can be maintained in one or more data stores of the anomaly detection system 130. Over time, a history of telemetry data 126 is obtained with time stamps corresponding to the time at which the telemetry data 126 was collected by, or transmitted from, the telemetry data module 124 of the client device 104.

In some embodiments, the telemetry data 126 is classified into multiple classes of data so that a particular class can be pinpointed for detecting an anomaly with respect to the class of data. Furthermore, the classification of the telemetry data 126 can be hierarchically organized in that different class levels can be defined. For example, a high-level class of data can include "errors," and the class of data for "errors" can include multiple lower-level subclasses for each unique error or error code. Another high-level class can be defined for "users," and the class of data for "users" can include multiple lower-level subclasses for each unique user ID. Similar class hierarchies can be defined, and any of the examples of telemetry data 126 described herein can be associated with an individual class and can be included in a higher level class and/or include lower level subclasses within its own class.

Additionally, the raw telemetry data 126 can be converted (or translated) into a set of metrics (for example, a count or a rate), as will be described in more detail below. For example, instances of a particular error code in the telemetry data 126 can be counted in order to generate counts of the particular error code. A class of data for the particular error code can additionally, or alternatively, be analyzed over time to generate rates of the particular error code as another type of metric. Any similar metric can be generated from the raw telemetry data 126 for a given class using the methods provided herein.

In some embodiments, the memory 134 further includes an aggregation module 138 that is configured to aggregate classes of data according to a component of interest in the system in which the software application(s) 110 is implemented. There are many components of interest that can be defined for the system implementing the software application(s) 110. For example, a component of interest can include an application crash or an error message that is generated during the operation of the application.

Figure 2:
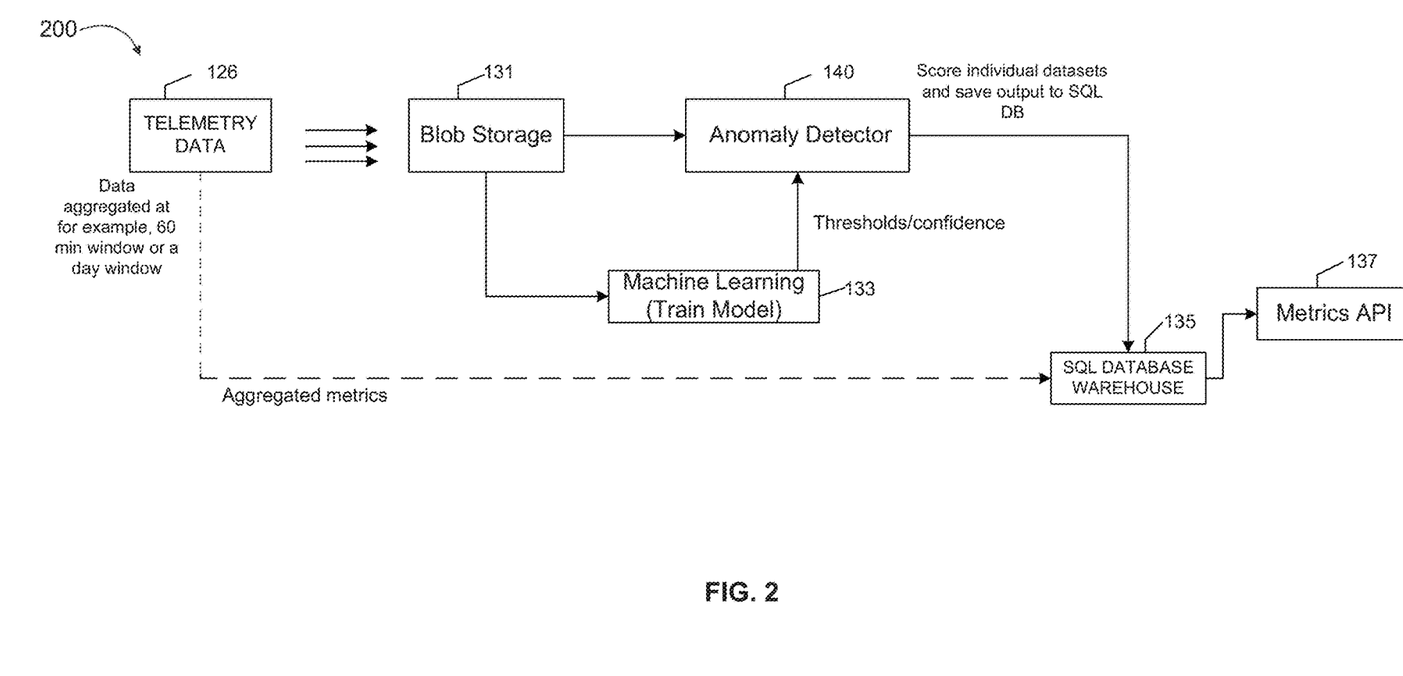
FIG. 2 is a diagram of an example computer architecture of the anomaly detection system of FIG. 1.

As an illustrative example, the aggregation module 138 can be configured to aggregate a count (for example, a metric) of particular error code (for example, a class of data) according to an application 110 being accessed by particular user 102(1). This allows the service provider of the application to monitor the operation state of applications 110 by analyzing the count of the particular error code with respect to the user 102(1) to see if there is an anomaly in the data. In an example scenario where multiple client devices 104 are reporting telemetry data 126 with abnormally high instances of a particular error code and/or abnormally high time periods showing the particular error code (as compared to a predicted count of the particular error code and/or a predicted time period in which the particular error code is expected to be shown), an anomaly can be detected. This detected anomaly can be used to infer that a problem has occurred FIG. 2 is a diagram of an example computer architecture of the anomaly detection system 130. In some embodiments, the anomaly detection system 130 includes a telemetry data store 126, a blob storage 131, a machine-learning training module 133—an anomaly detector 140, a structured query language (SQL) data warehouse 135, and an application programming interface (API) 137 associated with the set of metrics associated with the telemetry data 126. In some embodiments, the blob storage 131 provides a storage mechanism (that can store data in for example, one-hour chucks or one-day chunks) to store unstructured data in the cloud as objects (or blobs). The machine-learning training module 133 reads a set of training data, which usually consist of data for example, the previous 14 days of metric (however it could be any arbitrary amount or even a random sampling of data.) The metrics are aggregated without the dimension of interest (for example, a build type or number) and additional metrics are calculated based on the distribution of values. The result is saved as a model in blob storage 131 and is used for the next slice/window of data (for example, for the next day). The anomaly detector 140 is configured to determine a prediction error by comparing the prediction to the values of the aggregated metrics received from the aggregation module 138. In some configurations, the prediction error includes a difference between the actual value of the metric obtained from real-time telemetry data 126 and the expected value of the metric from the prediction. If the difference (for example, prediction error) is greater than a threshold difference at a particular time, this condition can be considered an anomaly. In some configurations, an anomaly is detected when the threshold difference is exceeded by the prediction error over a predetermined period of time (for example, 30 minutes). In this manner, an anomaly is detected if an anomalous condition persists for a predetermined period of time. It is to be appreciated that because the prediction generated is not an absolute threshold (for example, a single numerical value) normal fluctuations in the metric are not mistaken for an anomaly. Use of an absolute threshold for the prediction is insufficient in this regard, as it would either detect anomalies where there is nothing wrong with the client application that is being monitored, or not detect anomalies that should have been detected. Thus, the prediction generated by the anomaly detector 140 is more accurate than an absolute threshold prediction.

Figure 3A:
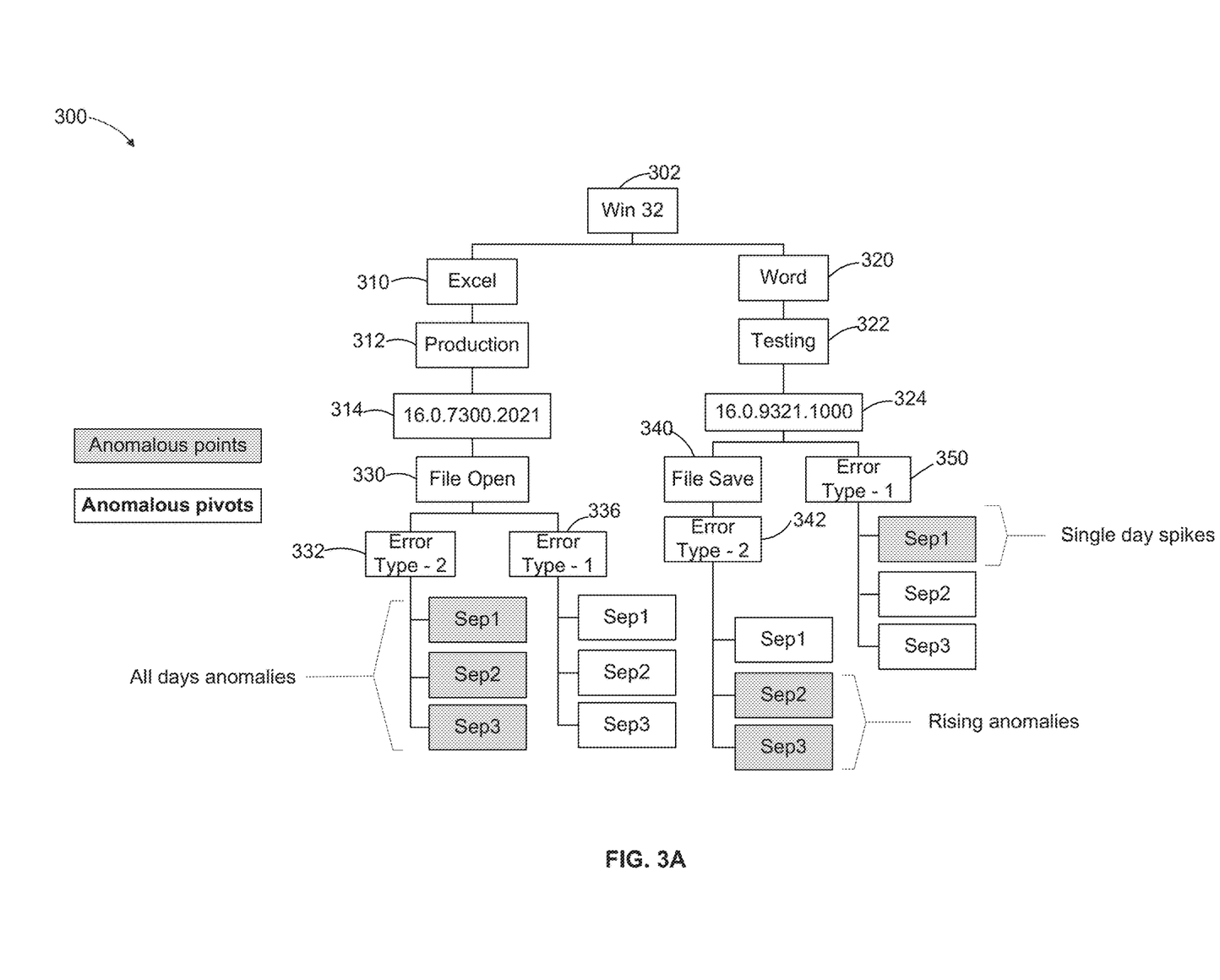
FIG. 3A is an example listing of anomalies at various levels and times associated with the use of various software applications.

FIG. 3A is an example hierarchical map 300 illustrating the various pivots monitored for anomalies. As shown in FIG. 3A, the hierarchical map 300 has an inverse tree-branch structure and the root node 302. In the example provided, root node 302 is associated with an operating system, for example, Windows, or Win 32. The root node 302 branches into several branches (each branch having pivot points) till each branch reaches a leaf node which does not branch any further. In the example shown in FIG. 3A, the root node 302 splits into two branches to denote applications 310 and 320. In this example, application 310 is a spreadsheet application (for example, an Excel software application) and application 320 is a word processing application (for example, a Word software application). Each software application 312 and 322 can have several branches, for example, production, testing, demonstration, etc. In the example provided in FIG. 3A, two branches are provided. The production version 312 of the software branches out of application 310, and the testing version 322 of the software branches out of application 320.

Software builds 314 and 324 associated with particular applications branch out of production software application 312 and testing software application 322, respectively. An operation 330 (in this case, "File Open") branches out of software build 314 and an operation 340 (in this case, "File Save") associated with the application 320 branches out of software build 324. Additionally, "Error Type—1" (represented by 336 and 350) associated with scenarios when the various operations are still functioning but not yet denied is also provided. For example, as shown in FIG. 3A, with a single spike in errors on September $1^{st}$ and no spikes on September $2^{nd}$ and $3^{rd}$, the application 320 is generally available except in the case of a "File Save" operation (at pivot point 340) that has rising anomalies on September $2^{nd}$ and $3^{rd}$ leading to access being denied due to "Error Type—2" (as shown in block 342). Similarly when the "File Open" 330 operation has anomalies on all days, namely September $1^{st}$, $2^{nd}$, and $3^{rd}$, access is denied due to "Error Type—2" (as shown in block 332).

Figure 3B:
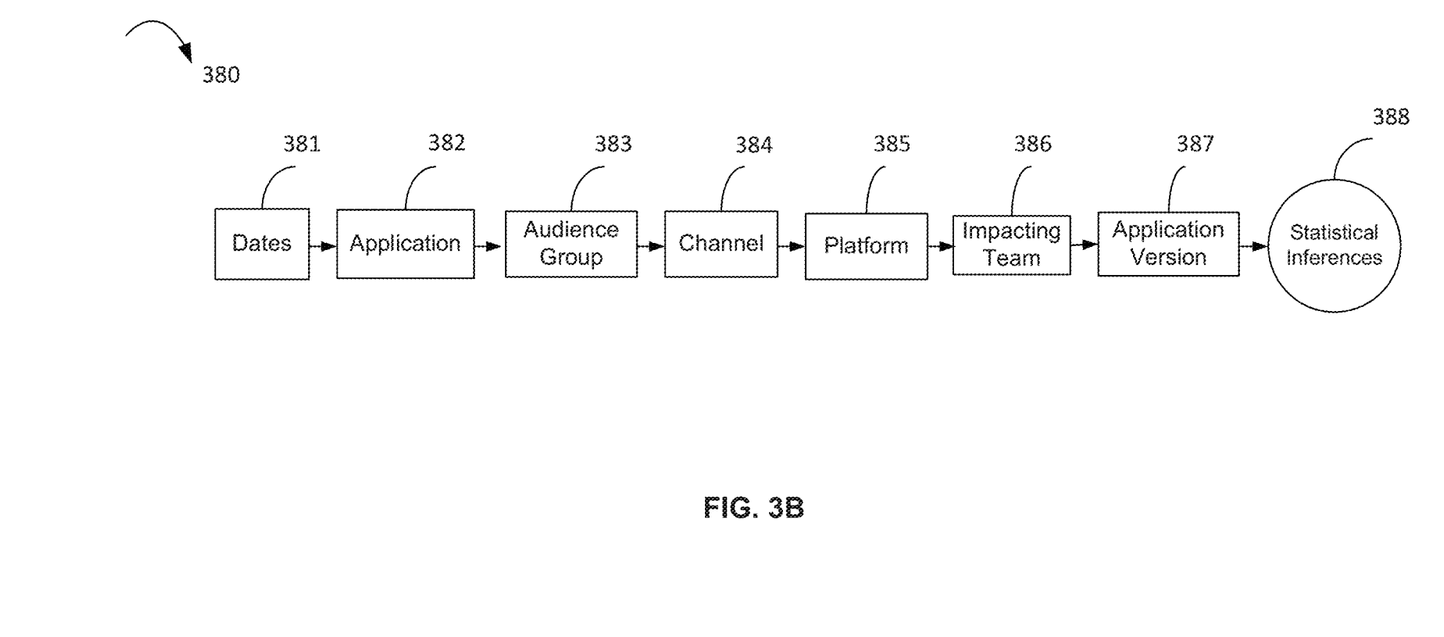
FIG. 3B illustrates an example of a pivot used to roll-up anomalies to perform statistical inferences.

FIG. 3B illustrates an example of a pivot 380 used for rolling-up of anomalies to perform statistical interferences. In the example shown in FIG. 3B, the pivot 380 includes pivot points 381-387 representing various types of parameters that are monitored for anomalies associated with the software application 110. Pivot points 381 corresponds to dates of inquiry for anomaly detection. Block 382 represents the software application 110 being monitored (for example, Word, Excel, etc.). Block 383 represents an audience group (for example, a listing of users, customers, etc.). Block 384 represents a channel associated with a client that received a particular build of the software application 110. Block 385 represents a platform (or an operating software) associated with the software application 110 (for example, Win32, Android, etc.). Block 386 represents the team that is being impacted (for example, an internal team or an external team). Block 388 represents the application version (for example, a particular build of the application). The system and methods provided herein allow for the various anomalies associated with each of the pivot points 381-387 to be rolled-up and analyzed across the pivot 380 and statistical interferences are made at block 388. In some embodiments, the roll-up is performed based on at least one of a severity of anomalies, a frequency of anomalies, and a user impact associated with the anomalies. In some embodiments, the frequency of anomalies is determined by computing the ratio of the anomalies identified per dimension to the total number of data points associated with the corresponding pivot.

Figure 3C:
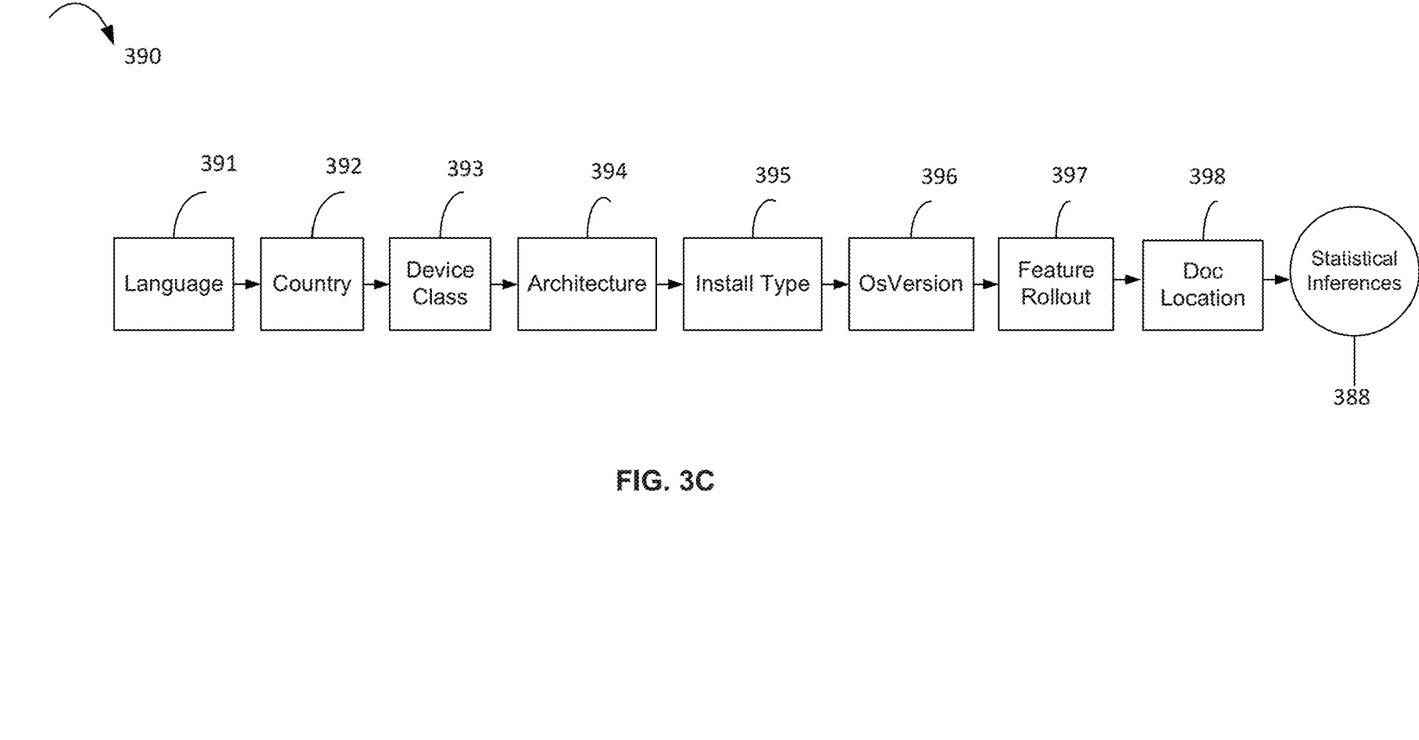
FIG. 3C illustrates another example of a pivot used to roll-up anomalies to perform statistical inferences.

FIG. 3C illustrates another example of a pivot 390 used for rolling-up anomalies to perform statistical inferences. In the example shown in FIG. 3C, the pivot 390 includes block 391-398 representing various types of parameters that are monitored for anomalies associated with the software application 110. Pivot point 391 represents the language version associated with the software application 110 (for example, English, French, Japanese, etc.). Block 392 represents the country version associated with the software application (for example, US, France, Japan, etc.). Block 393 represents the device class associated with the software application 110 (for example, mobile or desktop). Block 394 represents the architecture associated with the software application 110 (for example, processor-type such as ARM64, x86, etc.). Block 395 represents particular installation types (for example, Windows Installer or Click-to-Run version of Office). Block 396 represents various versions of the operating system. Block 397 represents various feature rollouts (for example, "controlled group" versus "for general use"). Block 398 represent various document location information (for example, internal/external Cloud or having a Universal Naming Convention (UNC) path). The system and methods provided herein allow for the various anomalies associated with each of the pivot points 391-398 are roll-up and analyzed across the pivot 390 and statistical interferences are made at block 388.

Figure 4:
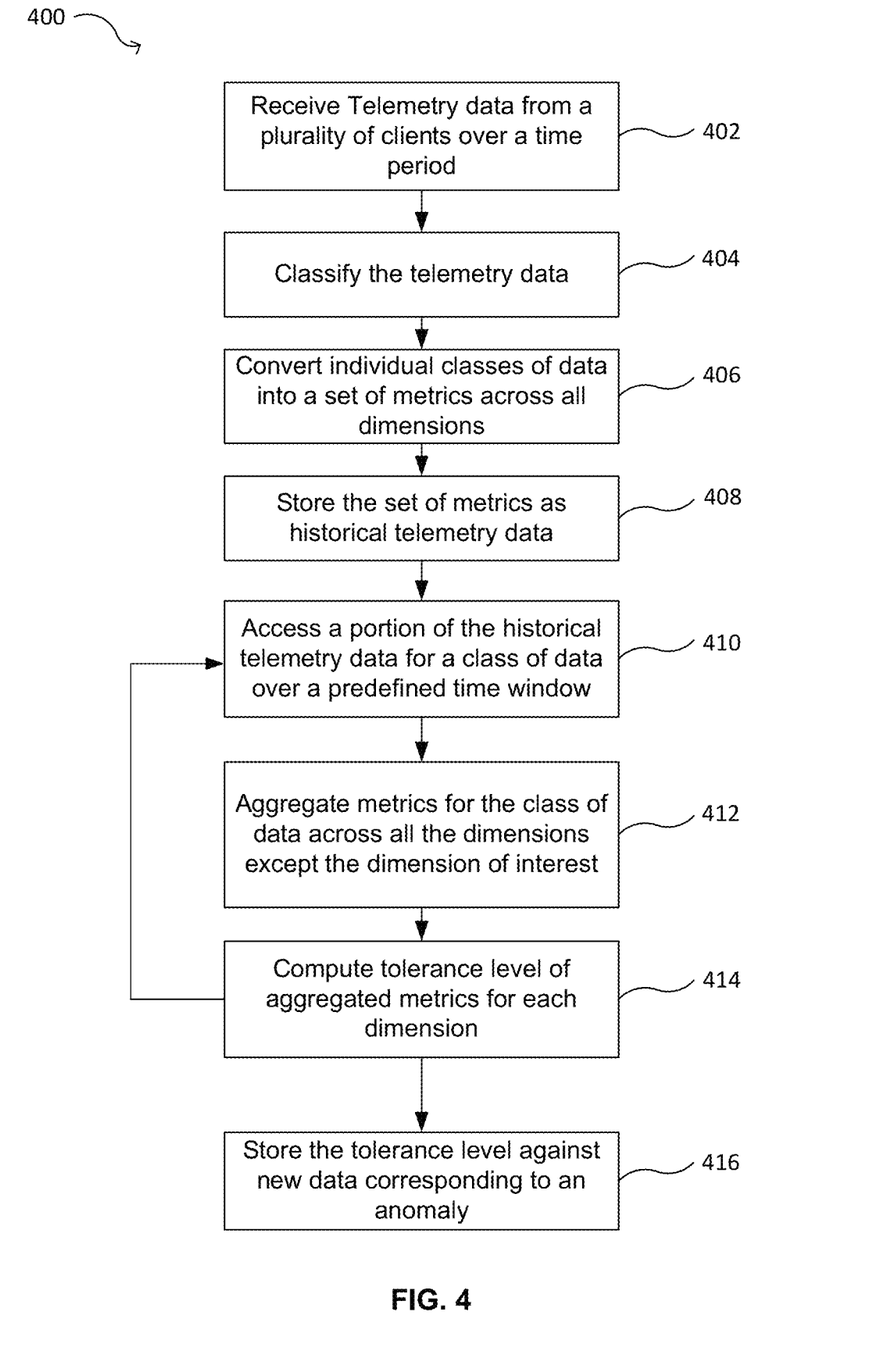
FIG. 4 is a flow chart of a method for creating a predictive scoring model in accordance with some embodiments.

FIG. 4 is a flow chart of an example method 400 for generating a predictive scoring model for classes of data aggregated according to components of interest in a system implementing software applications 110. The method 400 is described with reference to the previous Figures. In one embodiment, the method 400 is implemented in software executed by, for example, electronic processor 132.

At block 402, the telemetry data collector 136 receives data originating from a plurality of client devices 104 over a period of time. For example, as a result of client devices 104 executing respective client applications 122 to access a software application 110, telemetry data 126 is transmitted over the network 112 and received by the telemetry data collector 136. The telemetry data 126-2 includes data points that represent errors codes and error-free codes within each dimension.

At block 404, the received telemetry data is classified based on the class of data. The class of data gives the anomaly detection system 130 information as to what the problem is (for example, a problem relating to a particular error code). At block 406, the electronic processor 132 is configured to convert the individual classes of data into a set of metrics across all pivots.

At block 408, the method 400 includes storing the set of metrics as historical telemetry data 126-2. Over time, as samples of telemetry data 126 are continuously received, processed, and stored, the historical telemetry data 126-2 includes an extensive repository of processed telemetry data 126-2 that can be utilized for the anomaly detection process.

The electronic processor 132 is configured to access a portion of the historical telemetry data 126-2 for a class of data over a predefined time window (as shown at block 410). For example, historical telemetry data 126-2 for counts of a particular error code over the past month can be accessed at 410.

At block 412, the electronic processor 132 is configured to aggregate metrics for the class of data across all the dimensions except the dimension of interest. For example, counts of a particular error code over the past month can be aggregated by a particular operation associated with the software application 110 across multiple users running that particular operation on their client device 104.

At block 414, the electronic processor 132 is configured to compute the tolerance level of aggregated metrics for each dimension and class of data to generate a prediction of values that are to be expected during normal conditions.

Continuing with the above example, the prediction generated at block 414 can include a time series of expected counts of the particular error code over time for the particular operation on the client device 104.

At block 416, the method 400 includes storing the tolerance level against new data corresponding to an anomaly. The method 400 iterates over steps 410-414 to generate a prediction of the counts of the same error code for different users.

Figure 5:
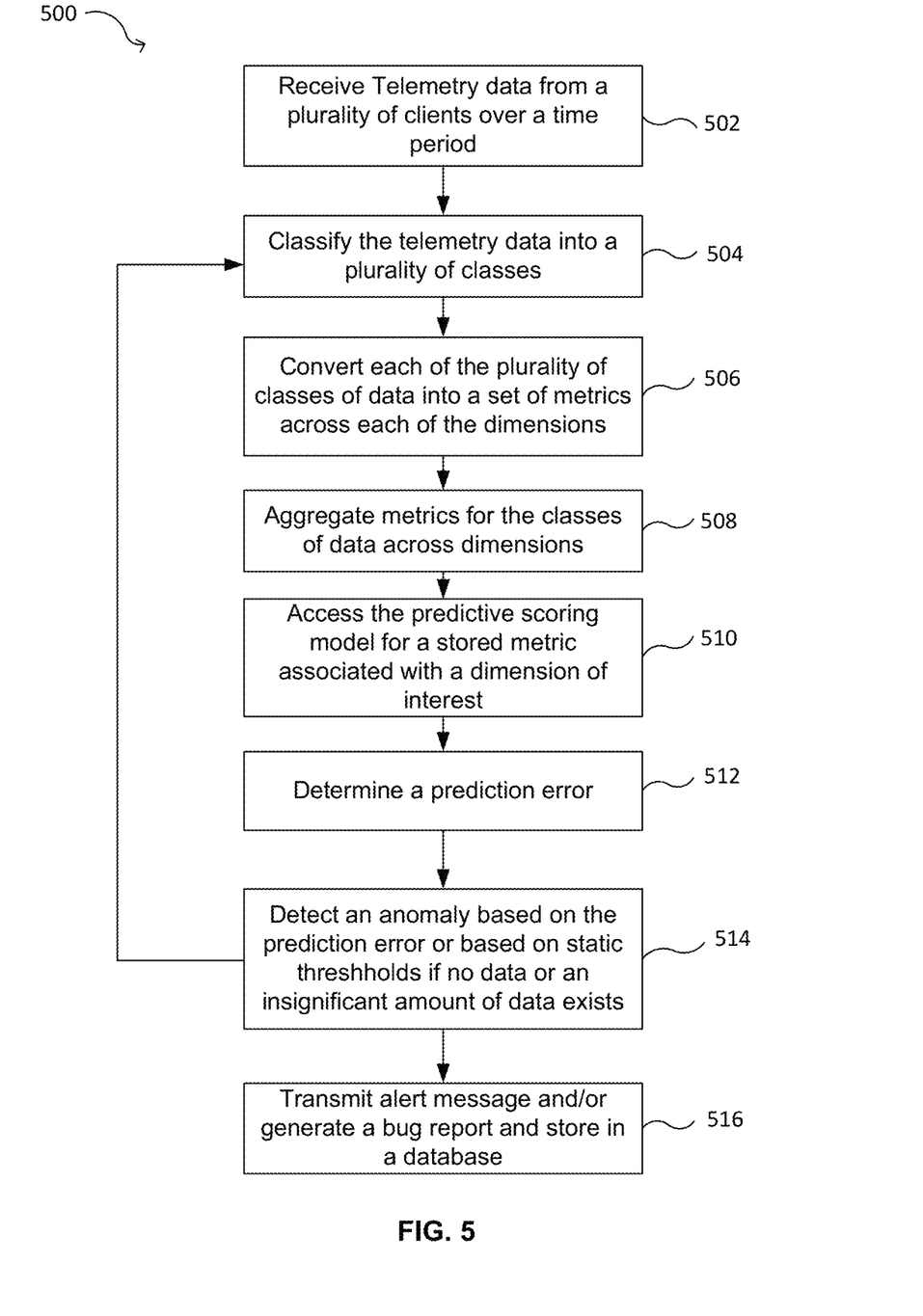
FIG. 5 is a flow chart of a method for detecting anomaly using the predictive scoring model shown in FIG. 4, in accordance with some embodiments.

FIG. 5 is a flow chart of an example method 500 for automatically detecting an anomaly using the predictive scoring model shown in FIG. 4, in accordance with some embodiments. The method 500 is described with reference to the previous Figures. At block 502, telemetry data 126-1 originating from a plurality of client devices 104 is received. In some embodiments, the method 500 includes receiving telemetry data originating from a plurality of client applications. For example, as a result of client devices 104 executing respective client applications 122 to access a software application 110, telemetry data 126-1 is transmitted over the network 112 and received by the telemetry data collector 136. In some embodiments, the telemetry data 126-1 is received at block 502 for a particular sampling interval. Thus, the telemetry data 126-1 can represent real-time telemetry data 126-2 that originates at the client devices 104 and can be used for runtime anomaly detection. The telemetry data 126-1 includes data points representing errors, error codes and error-free codes within each dimension.

At block 504, the electronic processor 132 is configured to classify the telemetry data 126-1 into various classes at the anomaly detector 140-1. For example, a class of data pertaining to an error code associated with a "crash" in the software application can be selected at block 504. As another example, a class of data pertaining to operations (for example, "File Open," "File Save," etc.) performed associated with software applications 110 can be selected at block 504.

At block 506, the classes of data selected at block 504 are converted to a set of metrics across each of the dimensions. The electronic processor 132 is configured to aggregate metrics for the classes of data across all the dimensions (as shown at block 508).

As shown at block 510, the electronic processor 132 is configured to access the predictive scoring model (described by the flowchart shown in FIG. 4) for a stored metric associated with a dimension of interest. The electronic processor 132 is configured to determine a prediction error (block 512) based on accessing the predictive scoring model as provided in block 510.

At block 514, the electronic processor 132 detects an anomaly based on the prediction error determined at block 512. In some embodiments, the anomaly is detected based on or using a static threshold in the event there is no historical data available or when there is an insignificant amount of data. The method 500 iterates over steps 504-514 to detect anomalies associated with software application 110 and generate an indication of the anomaly and store the indication in data warehouse 135. In some embodiments, the electronic processor 132 is configured to detect data points having errors at a deepest level associated with the one or more dimensions (or pivots), and roll-up the data points having errors from the deepest level associated with one or more dimensions. In some embodiments, the method includes determining, with the electronic processor 132, the frequency of anomalies by computing a ratio of the anomalies identified per dimension to a total number of data points associated with a corresponding dimension At block 516, the electronic processor 132 outputs and alert message. The alert message is sent to the display device 139. In some embodiments, the electronic processor 132 is configured to generate a bug report and store the bug report in a database.

Various features and advantages of some embodiments are set forth in the following claims.

What is claimed is:

1. A computer system for anomaly detection using application telemetry, the computer system comprising:
   an electronic processor configured to
      receive telemetry data originating from a plurality of client applications, the telemetry data including data points representing errors associated with one or more operations of the plurality of client applications,
      associate each data point with a branch of a plurality of branches included in a hierarchical map of data classes,
      for each of the plurality of branches included in the hierarchical map generate one or more metrics based on the number of data points associated with the branch,
      access a predictive scoring model to determine a prediction error associated with a branch of interest, wherein the prediction error is a difference between a predicted metric associated with the branch of interest and the generated one or more metrics for the branch of interest,
      detect an anomaly when the prediction error is greater than a threshold;
      output an alert message associated with the anomaly; and
      display the alert message.

2. The computer system of claim 1, wherein the electronic processor is further configured to
   generate the predictive scoring model using historical telemetry data.

3. The computer system of claim 1, wherein the electronic processor is further configured to
   detect data points having errors at a deepest level associated with the plurality of branches.

4. The computer system of claim 1, wherein the anomaly is determined by rolling-up data points with errors from a deepest level associated with the plurality of branches.

5. The computer system of claim 4, wherein the anomaly is rolled-up based on an item selected from the group consisting of a severity of anomalies, a frequency of anomalies, and a user impact associated with anomalies.

6. The computer system of claim 5, wherein the electronic processor is further configured to
   determine the frequency of anomalies by computing a ratio of the anomalies identified per branch to a total number of data points associated with a corresponding branch.

7. The computer system of claim 1, wherein the electronic processor is further configured to
   generate an indication of the anomaly and store the indication in a database.

8. A method for anomaly detection using application telemetry, the method comprising:
   receiving telemetry data originating from a plurality of client applications, the telemetry data including data points representing errors associated with one or more operations of the plurality of client applications;

associating each data point with a branch of a plurality of branches included in a hierarchical map of data classes;

for each of the plurality of branches included in the hierarchical map generating one or more metrics based on the number of data points associated with the branch;

accessing a predictive scoring model to determine a prediction error associated with a branch of interest, wherein the prediction error is a difference between a predicted metric associated with the branch of interest and the generated one or more metrics for the branch of interest;

detecting an anomaly when the prediction error is greater than a threshold; and outputting an alert message associated with the anomaly.

9. The method of claim 8, further comprising:
generating the predictive scoring model using historical telemetry data.

10. The method of claim 8, further comprising:
detecting pivot points having errors at a deepest level associated with the plurality of branches.

11. The method of claim 10, further comprising:
rolling-up the data points having errors from the deepest level associated with the plurality of branches.

12. The method of claim 8, further comprising:
rolling-up the branch based on an item selected from the group consisting of severity of anomalies, frequency of anomalies, and user impact associated with the anomalies.

13. The method of claim 12, further comprising:
determining the frequency of anomalies by computing a ratio of the anomalies identified per branch to a total number of data points associated with a corresponding branch.

14. The method of claim 8, further comprising:
generating an indication of the anomaly and storing the indication of the anomaly in a database.

15. A non-transitory computer-readable medium containing instructions that when executed by one or more electronic processors cause the one or more electronic processors to:
receive telemetry data originating from a plurality of client applications, the telemetry data including data points associated with errors associated with one or more operations;
associate each data point with a branch of a plurality of branches included in a hierarchical map of data classes;
for each of the plurality of branches included in the hierarchical map generate one or more metrics based on the number of data points associated with the branch;
access a predictive scoring model to determine a prediction error associated with a branch of interest, wherein the prediction error is a difference between a predicted metric associated with the branch of interest and the generated one or more metrics for the branch of interest;
detect an anomaly when the prediction error is greater than a threshold; and
transmit an alert message associated with the anomaly.

16. The non-transitory computer-readable medium of claim 15, further containing instructions that when executed by one or more electronic processors cause the one or more electronic processors to:
generate the predictive scoring model using historical telemetry data.

17. The non-transitory computer-readable medium of claim 15, further containing instructions that when executed by one or more electronic processors cause the one or more electronic processors to:
detect pivot points having errors at a deepest level associated with the one or more branches, and
roll-up the data points having errors from the deepest level associated with one or more branches.

18. The non-transitory computer-readable medium of claim 15, further containing instructions that when executed by one or more electronic processors cause the one or more electronic processors to:
roll-up the branch based on an item selected from the group consisting of a severity of anomalies, a frequency of anomalies, and a user impact associated with the anomalies.

19. The non-transitory computer-readable medium of claim 18, further containing instructions that when executed by one or more electronic processors cause the one or more electronic processors to:
determine the frequency of anomalies by computing a ratio of the anomalies identified per branch to a total number of data points associated with a corresponding branch.

20. The non-transitory computer-readable medium of claim 15, further containing instructions that when executed by one or more electronic processors cause the one or more electronic processors to:
generate an indication of the anomaly and store the indication of the anomaly in a database.

* * * * *